United States Patent
Clamer et al.

(10) Patent No.: US 7,041,722 B2
(45) Date of Patent: *May 9, 2006

(54) NOBLE METAL PREPARATION AND USE THEREOF FOR PRODUCTION OF NOBLE METAL DECORATIONS BY MEANS OF DIRECT AND INDIRECT PRINTING

(75) Inventors: Elisabeth Clamer, Offenbach (DE); Anne Kraus-Klapper, Wiesbaden (DE); Andreas Schulz, Offenbach (DE); Elisabeth Zimmerbeutel, Rodenbach (DE)

(73) Assignee: Ferero GmbH, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/398,386

(22) PCT Filed: Oct. 9, 2001

(86) PCT No.: PCT/EP01/11654

§ 371 (c)(1),
(2), (4) Date: Sep. 26, 2003

(87) PCT Pub. No.: WO02/30681

PCT Pub. Date: Apr. 18, 2002

(65) Prior Publication Data

US 2004/0059026 A1    Mar. 25, 2004

(30) Foreign Application Priority Data

Oct. 13, 2000  (DE) ................................ 100 50 949

(51) Int. Cl.
*C08K 3/10*    (2006.01)

(52) U.S. Cl. ...................... 524/403; 524/392; 524/398; 428/195; 428/209; 428/914; 427/147

(58) Field of Classification Search ................ 524/392, 524/398, 403; 428/195, 209, 914; 427/147
See application file for complete search history.

(56) References Cited

U.S. PATENT DOCUMENTS

| 3,092,504 A | 6/1963 | Langley et al. |
| 3,163,665 A | 12/1964 | Fitch |
| 3,385,748 A | 5/1968 | Neale et al. |
| 6,303,679 B1 | 10/2001 | Schulz et al. |
| 6,355,714 B1 * | 3/2002 | Schulz et al. ............... 524/398 |

FOREIGN PATENT DOCUMENTS

| DE | 1232168 | 1/1967 |
| DE | 1421865 | 1/1969 |
| DE | 3122546 A1 | 12/1982 |
| DE | 3616547 C1 | 9/1987 |
| DE | 3736583 C1 | 11/1988 |
| DE | 19831141 A1 | 1/2000 |
| EP | 0334107 A2 | 9/1989 |
| EP | 0440877 A1 | 8/1991 |

OTHER PUBLICATIONS

European Search Report for PCT/EP01/11654, dated Mar. 6, 2003, seven pages.

* cited by examiner

*Primary Examiner*—Peter Szekely
(74) *Attorney, Agent, or Firm*—Rankin, Hill, Porter & Clark LLP

(57) ABSTRACT

The invention relates to a noble metal preparation for the production of noble metal decorations on firable decoration substrates by direct printing and indirect printing (decalcomania method).

The print quality of the noble metal compounds and preparations containing a binder system on markedly curved glass may be improved when the decalcomania method is used in that the binder system consists of a resin mixture comprising (a) 25 to 50 wt. % of polyamide resins, (b) 5 to 30 wt. % of sulphurized recent resins, (c) 10 to less than 20 wt. % of colophony-modified resins, (d) 10 to 40 wt. % of alkyl phenolic resins and (e) 0 to 30 wt. % of other resins compatible therewith, wherein two or more components of said resin mixture may be present in the form of a reaction product formed at 50 to 150° C. and/or wherein one or more components of said resin system or reaction product thereof may be present in the form of a reaction product formed at 50 to 150° C. in the presence of a sulphur-containing gelation agent and the noble metal compounds.

20 Claims, No Drawings

NOBLE METAL PREPARATION AND USE THEREOF FOR PRODUCTION OF NOBLE METAL DECORATIONS BY MEANS OF DIRECT AND INDIRECT PRINTING

DESCRIPTION

The invention relates to new noble metal preparations for the production of noble metal decorations on firable decoration substrates such as glass, ceramic, bone china and porcelain, and to a process for their production. The preparations are suitable for direct printing and for indirect printing, which is why the invention also relates to the use of the noble metal preparation and to a decalcomania containing such a noble metal preparation.

Various noble metal preparations, in particular gold preparations, are known which may be applied to firable decoration substrates by direct or indirect printing, in other words by the decalcomania method, and lead to a bright or burnished noble metal decoration. Preparations which lead to bright decorations are described as imitation gold preparations. Imitation gold preparations contain one or more organic noble metal compound(s) which is(are) substantially soluble in an organic medium. Typical noble metal compounds for bright noble metal preparations include so-called resonates, in particular sulphoresonates, in other words thiolates of terpene thiols, as well as synthetic noble metal thiolates of various other organic mercapto compounds. So-called burnished noble metal preparations, in particular burnished gold preparations, contain the noble metal in the form of compounds which are soluble and/or insoluble in the medium, for example gold sulphide and, in many cases, elementary noble metals in powder form. These preparations usually also contain one or more soluble fluxes, in particular organic compounds such as resonates, carboxylates and alkoxides, in particular of elements from the series comprising Rh, Bi, Cr, V, Ni, Co, Fe, Sn, Zr, Ta, Si, B and Al, which influence the formation of the noble metal film and its adhesion to the substrate. A medium which is also suitable in preparations for decalcomanias consists substantially of one or more mutually compatible binders and solvents for the resins and noble metal compounds, or it may be substantially free of solvent and consist substantially of thermoplastic resins which are liquid at application temperature and optionally wax-like compounds. Reference is made to U.S. Pat. Nos. 3,092,504 and 3,163,665, DE-AS 14 21 865 and EP-B 0 440 877 by way of example.

With the decalcomanias required for indirect printing, a picture layer consisting of or containing the noble metal preparation is applied directly to a carrier, in particular a paper provided with a water-soluble size coating or a wax layer or onto a backing layer, and this picture layer is filmed over immediately or after application of an intermediate layer containing a glass flux. Reference is made to DE-AS 12 32 168, DE 36 16 547 C1 and DE 31 22 546 C2 by way of example.

Although the binders contained in the medium of the noble metal preparations burn during firing, they have a considerable influence on the quality of the decoration. It has been found that, depending on the binder system used, excessively dark decorations, decorations with a bright fog and/or inadequate combustion and inadequate adhesion may often occur. A further cause of defects in decorations may be that soluble noble metal compounds are released from the picture layer when filmed over, which leads to reduced brilliance, red fringes and to fogging and/or poorly defined decorations. Decalcomanias may also have decoration defects caused by cracks.

Various methods of solving or mitigating the aforementioned problems have been proposed. According to DE-AS 12 32 168, a protective layer which is impermeable for the coating layer and consists of an oxidisable or polymerisable material containing an alkyd, phenolic, urea or epoxy resin or dry oil was arranged between the picture layer and the coating layer. The additional layer reduces the fringes but increases the cost.

The picture layer of the decalcomanias according to DE-PS 36 16 547 is based on a bright noble metal preparation containing 8 to 30 wt. % of a thermoplastic resin. A resin from the series. comprising asphalt resin, polyamide resin, maleinate resin, phenolic resin, ketone resin and epoxy resin is used as thermoplastic resin. The use of a single type of resin leads to decalcomanias of unsatisfactory quality in one or other direction. The inventors of the present application have found that a thermoplastic polyamide resin leads to satisfactory flexibility and extensibility and therefore to crack-free decalcomanias, but this does not guarantee adequate compatibility with the organic noble metal compounds and flux compounds, resulting in decoration defects, in particular inadequate brightness, and/or imperfections in application such as, in particular, inadequate flow. Maleinate resins lead to decorations which are often bright but are at the same time too dark in appearance; phenolic resins often lead to inadequate combustion and therefore to inadequate brightness and/or inadequate adhesion. The document just evaluated does not disclose any binder mixtures for overcoming the problems.

It is known from DE-AS 14 21 865 also to use media with more than one binder in noble metal preparations, for example a mixture of a colophony resin and asphalt resin. However, this combination leads to decoration defects in decalcomanias, including cracks.

A commercially available imitation gold preparation for indirect printing on glass and bone china is the product GGP 1230 produced by Heraeus. Although this product allows the production of crack-free bright decorations, its resistance to dishwashing, in other words its adhesion to glass, is considered to be unsatisfactory. Visible damage to the decoration occurs after only 20 washing cycles in a glass washing machine. GGP 1230 did not produce a smooth gold film on bone china. The adhesion of decorations to various substrates depends on both the flux system and the binder system. Details of the composition of the binder system of this preparation cannot be determined by analysis, but amide groups make the presence of a polyamide likely. A further preparation—GGP 1215/Heraeus—contains amide groups and structural elements of colophony; this resin is suitable for porcelain and earthenware but not for glass.

DE-OS 198 31 141 A1 discloses a noble metal preparation for the production of noble metal decorations on firable decoration substrates by direct printing and indirect printing (decalcomania method). The print quality of the noble metal compounds and preparations containing a binder may be improved if the binder system consists of a resin mixture comprising (a) 25 to 40 wt. % of polyamide resins, (b) 5 to 30 wt. % of sulphurised recent resins, (c) 20 to 55 wt. % of colophony-modified resins, (d) 0 to 30 wt. % of alkyl phenolic resins and (e) 0 to 30 wt. % of other resins compatible therewith, or of reaction products of the resin mixture formed at 50 to 150° C. and/or of reaction products, formed at 50 to 150° C. in the presence of a sulphur-containing gelation agent, of the resin mixture containing the noble metal compounds or the reaction mixture thereof. Although preparations of this type have good properties on plain, slightly curved glasses, cracks in the decalcomanias or decorations appear when they are used on markedly curved glasses by the decalcomania method.

It is an object of the invention to provide further noble metal preparations, in particular imitation gold preparations, which are suitable for the production of decalcomanias and lead to high-quality, in particular light, bright, crack-free perfectly burnt-out decorations with improved resistance to dishwashing even on markedly curved glass.

A noble metal preparation has been found which meets the requirements of suitability for high-quality decalcomanias, the essence lying in a binder system according to the invention. The invention accordingly relates to a noble metal preparation for the production of noble metal decorations on firable decoration substrates, containing one or more noble metal compounds of Au, Ag, Pd or Pt, a medium whose binder system contains a polyamide and colophony resin and one or more fluxes, characterised by a binder system consisting of a resin mixture consisting of (a) 25 to 50 wt. % of one or more polyamide resins,
(b) 5 to 30 wt. % of one or more sulphurised recent resins, in particular sulphurised dammar resin,
(c) 10 to less than 20 wt. % of one or more colophony-modified resins,
(d) 10 to 40 wt. % of one or more alkyl phenolic resins and
(e) 0 to 30 wt. % of other resins, excluding non-plasticising resols, wherein two or more components of said resin mixture may be present in the form of a reaction product formed at 50 to 150° C. and/or wherein one or more components of said resin system or reaction products of at least two resin components may be present in the form of a reaction product formed at 50 to 150° C. in the presence of a sulphur-containing gelation agent and the noble metal compounds.

The sub-claims relate to preferred embodiments of the noble metal preparation.

The preferred binder system contains colophony-modified resin and alkyl phenolic resin in a ratio by weight of 1:1 to 1:2. According to a further embodiment, at least two colophony-modified resins different from the sulphurised recent resin, the alkyl phenolic resins and the polyamide resin are used in a ratio by weight of 10:1 to 1:10.

According to a further preferred embodiment, the binder system consists substantially of 15 to 19.5 wt. % of one or more colophony-modified resins, 8 to 20 wt. % of sulphurised dammar resin, 30 to 45 wt. % of polyamide resin and 25 to 35 wt. % of alkyl phenolic resin, wherein resin components may have formed reaction products among one another and/or in the presence of the noble metal compounds and a sulphur-containing gelation agent at 50 to 150° C.

The invention also relates to a decalcomania of which the decoration-forming layer has been produced using the noble metal preparation according to the invention. The noble metal preparation may be applied by a conventional direct printing process or by indirect printing, in other words using the decalcomania containing the preparation in the picture layer, to a firable decoration substrate such as glass, ceramic, porcelain, bone china and other silicate-containing materials and may be stoved thereon under conventional conditions, high-quality decorations being obtained.

The noble metal preparations according to the invention may be bright noble metal or burnished noble metal preparations. Bright preparations, in particular bright or imitation gold preparations are preferred, which contain compounds of silver and/or platinum or palladium for colour modification in addition to one or more gold compounds. Imitation gold metal preparations usually contain 6 to 15 wt. % of noble metals in the form of organic, in particular sulphur-containing compounds such as sulphoresinates and other thiolates which are soluble in the medium. Burnished gold preparations contain inorganic insoluble noble metal compounds and/or elementary noble metal as an alternative or in addition to organic soluble gold compounds; the gold content of these burnished preparations is generally in the range of 15 to 40 wt. %.

The medium of preparations according to the invention may contain solvents or be free of solvents. The binder content of preferred solvent-containing preparations usually lies in the range of 10 to 30 wt. %. In addition to being adjusted by the resin combination, the viscosity of the preparations may be adjusted by the quantity and type of one or more solvents and/or by thermal treatment of the binder combination and/or by gelation of the medium containing noble metal compounds in the presence of a sulphur-containing gelation agent at elevated temperature. For producing screen printing pastes, the mixture is preferably gelled from the individual binders or a thermally pretreated mixture thereof in the presence of the decoration-forming noble metal compounds and a sulphur-containing gelation agent. In this instance, gelation denotes a crosslinking process which still allows screen printing.

A preparation suitable for decalcomanias with a high decorative quality may be obtained only by combining the binder system containing resins from the four above-mentioned classes. The combination of the colophony resin content, which is smaller than in the state of the art and the obligatory use of an alkyl phenolic resin in combination with the sulphurised dammar resin and polyamide resin provides the necessary high flexibility which leads to crack-free decorations on markedly curved glass. The drawbacks of the polyamide resins are eliminated by the other resins. Surprisingly great significance is attached to the sulphurised natural resin with respect to brightening.

In addition to consisting of the above-mentioned resin combination, the binder system can consist of two or more resin components of the system in the form of reaction products formed therefrom during production of the preparation at 50 to 15° C., in particular 80 to 140° C. Similarly, one or more resin components in the form of reaction products formed in the presence of noble metal compounds and sulphur-containing gelation agents may also be used.

According to the alternative preferred for screen-printable noble metal preparations, the binder system consists of reaction products which may be formed from the above-mentioned resin combination at 50 to 150° C. in the presence of a sulphur-containing gelation agent and the noble metal compounds.

Suitable gelation agents include agents of the type known from the vulcanisation of rubber. Examples include sulphur, polysulphides, organic di- and oligosulphides, sulphenamides, dithiocarbaminates, of which diothio-4,4'-dimorpholine is particular preferred. The amount of sulphurisation agent used generally lies in the range of 0.1 to 3 wt. %. The viscosity of the preparation increases during gelation which is expediently carried out in the presence of the solvent. S-bridge formation probably occurs between components of the sulphur-containing binder system and/or with the sulphur-containing noble metal compounds. The necessary viscosity behaviour is achieved due to gelation; the stability of the preparation in storage and the stoving behaviour are also improved.

Alkyl phenolic resins include alkyl phenol-formaldehyde resins of which the para- and optionally also meta-position in the phenol is alkyl-substituted in the phenol, in particular with a tert. butyl, diisobutyl or phenyl group, so these resins do not crosslink or crosslink to a lesser extent. The resins had a softening point in the range of 40 to 120° C. and are soluble or diluable in aliphatic hydrocarbons. Suitable resins are described in Kittel "Lehrbuch der Lacke und Beschichtungen" (1961), Vol. I.1, pages 341 to 346.

Suitable polyamide resins are those used as paint resins and hot-melt adhesives. The softening point of the polyamide resins lies, in particular, in the range of 50 to 150° C., preferably in the range of 80 to 120° C. They are generally aliphatic polyamides-with structural elements of a dicarboxylic acid and/or of a diamine with more than 8 carbon atoms; dimeric fatty acids are preferred dicarboxylic acid components in the polyamides.

The sulphurised recent resins are sulphurised resins from living trees. Some of these natural resins have terpene structures. Sulphurised resins based on sesquiterpenes, di- and, in particular, tri-terpenes are preferred. During sulphurisation, the terpene resins sometimes absorb considerable amounts of sulphur in the form of thioether bridges, di- and oligosulphide bonds and thiol groups. Sulphurised resins to be used according to the invention preferably contain 5 to 20 wt. % of sulphur. Sulphurised dammar resin with an S content of 5 to 20 wt. %, preferably 8 to 12 wt. % is particularly preferred.

Suitable colophony-modified resins include those used as paint resins. These resins have a softening point in the range of 50 to 160° C., in particular 80 to 140° C. They are, for example, glycerine esters of colophony, esters of primary dihydric to hexahydric alcohols such as pentaerythritol, trimethylolpropene, trimethylolethane, dipentaerythritol and neopentylglycol, with colophony, glycerine and pentaerythritol esters of maleic acid-modified colophony as well as colophony-modified phenol resins. Examples of these resins and of their alcohol component, acid value, colour and solubility may be found in common paint tables (for example Karsten, Lackrohstofftabellen (1987), 8th Edition, Curt R. Vincentz Verlag, Hanover.

When selecting the resin components in the scope of this invention, the person skilled in the art will ensure by orientating preliminary experiments that the components are mutually compatible and are soluble in the selected solvent system. This testing is necessary, in particular, if other resins (e) are additionally used in these preparations. Although the other resins optionally present, for example asphalt resins, do not affect combustion, non-plasticising resols have proven unsuitable.

Solvent-containing preparations generally contain 10 to 60 wt. %, in particular 30 to 55 wt. % of one or more solvents. Aliphatic, cycloaliphatic, aromatic hydrocarbons, in particular hydroaromatic compounds such as tetralin, and terpene hydrocarbons, ketones and alcohols. The boiling point of the solvents is expediently above 110° C., in particular in the range of about 140 to 230° C. The preparation preferably contains more than one solvent, for example a mixture of substantially a hydroaromatic compound, a terpene hydrocarbon, a terpene alcohol and/or carbocyclic ketone or/and alcohol.

Solvent-free or at least solvent-depleted preparations expediently contain wax-like compounds for adjusting optimum printing properties, for example as solubilisers, adjustment of the softening point and viscosity/temperature behaviour. Suitable substances include polyolefin waxes, fatty alcohols, fatty amides and polyalkylene glycols. Preparations according to the invention may additionally contain conventional plasticisers such as dibutylphthalate.

Production of the preparations involves mixing and homogenisation of the binder. The individual resins are expediently brought into contact with one another in succession with stirring at 50 to 150° C., and solvents may be present in the case of solvent-containing systems. According to a preferred embodiment, a sulphurised recent resin, for example sulphurised dammar resin, and one or more colophony-modified resins are stirred in an alkyl aromatic solvent at 80 to 140° C. to homogeneity, then the alkyl phenolic resin, if present, is added and homogenised again and finally the polyamide resin is introduced and homogenised at said temperature. The noble metal compounds are introduced into the binder system. If desired, and this corresponds to a particularly preferred embodiment for screen printing pastes, the mixture is gelled at 50 to 150° C., preferably 80 to 140° C. with 0.1 to 3 wt. %, in particular 0.5 to 2 wt. % of a sulphur-containing gelation agent. The amount of sulphurising agent used is based on the desired processing viscosity. Preparations with a low binder content make it expedient to use more sulphurising agent. During this gelation, sulphurisable components of the binder and/or of the noble metal thiolate are crosslinked via sulphide, disulphide or oligosulphide bridges. Binders which are unsaturated and/or already partially sulphurised are sulphurisable. The fluxes may be added before or after the thermal treatment with a sulphurising agent. The preparations according to the invention generally contain a conventional amount of one or more fluxes known to a person skilled in the art. Organic compounds of Rh, Cr and Bi are usually present as fluxes, but often additionally further compounds such as those of Si, Al, Co, Ni, Sn, Ta, Ti and V.

The preparations according to the invention may be used for the production of decalcomanias. Decalcomanias of this type comprise a backing with a conventional water-soluble or thermally softened release layer, a decoration-forming layer composed of the noble metal preparation according to the invention and a film-forming coating layer composed of a conventional film-forming agent, for example a methacrylate resin. The decalcomanias may additionally have a backing layer arranged between the release layer and picture layer and/or an outer layer arranged between the picture layer and coating layer. The backing layer may be a layer containing oxides and/or glass frits, whereby adhesion is improved and/or matt decorations are obtainable (see, for example, DE-PS 31 22 546).

The outer layer is, for example, a layer containing a glass frit, whereby abrasion-resistant decorations are obtainable (see, for example, DE-PS 36 16 547). The picture layer is applied in the conventional manner, preferably by screen printing.

Both the noble metal preparation according to the invention and the decalcomania containing this preparation may be used in the known manner for the production of noble metal decorations on firable decoration substrates. Conventional printing processes such as screen printing and pad printing may be used for direct printing. The preparation may obviously also be applied by brushes or by an etching machine. Such substrates for direct and indirect printing include, for example, glass, ceramic, bone china and porcelain. The decoration applied to the carrier is stoved in the known manner under firing conditions adapted to the substrate.

The use of the preparations according to the invention by means of direct printing or indirect printing leads to high quality decorations. Bright preparations lead to light, bright, crack-free decorations. The following examples illustrate the invention.

EXAMPLES

Production of the preparations (general directions)

A 50 wt. % solution of sulphurised dammar resin (gD) in a mixture of pine oil and toluene with an S content in the solution of 9.1% and the colophony resin from the series comprising glycerine esters of maleic acid-modified colophony (softening point 142° C.) were homogenised at 125° C. in the presence of a hydrocarbon solvent. An alkyl phenol resin with a melting range of 50 to 60° C. (=APH) was then added and homogenised at 125° C. A polyamide resin based on a fatty acid dimmer with a softening point of about 100° C. (=PA) was finally incorporated into the system at the same temperature. Reactive groups of the resin were able to react with one another at the selected temperature. The noble metal compounds as well as fluxes and, if necessary, further solvents were added to the binder system.

As the production of the preparations of the example and comparison example shown in the table involved gelation, this was carried out before addition of the fluxes in that the gelation agent di-4,4'-morpholino disulphide was added to the binder system, containing the decoration-forming noble metal compounds and produced in the above-described manner, and gelation was carried out at 110 to 120° C. 1.0 g of di-4,4'-morpholino disulphide was used as gelation agent in the comparison example and example according to the invention.

A flux combination containing the following metals in the form of resonates (wt. %):

0.03 Rh; 0.05 Si; 0.04 Cu; 0.02 B; 0.04 Bi; 0.03 Zr; 0.10 S; 0.06 V were used in the example and comparison example.

The preparation according to the invention contained tetralin and cycloaliphatic alcohols as solvents in addition to the pine oil of the sulphurised dammar. The preparation in the comparison example additionally contained alkyl aromatic compounds, cyclohexanone, benzylalcohol and methylcyclohexanol. The pressure viscosity of the pastes was in the range of 2,000 to 10,000 mPa·s.

The preparations in the example and comparison example of the closest state of the art were produced using a gold sulphoresinate (50% Au); the Au content of each of the preparations was 9.8 wt. %. The preparations additionally contained 5 wt. % of a silver mercaptide (20% Ag).

For indirect printing, decalcomanias were produced in the conventional manner and applied to markedly curved beer glasses. The printing paste was applied to meta paper by screen printing, dried and then filmed over with a conventional commercial film solution (80450 produced by the company dmc$^2$).

Firing conditions on glass: Heating to 600° C. in 1 h, 15 min residence time, cooling to 25° C. in 1 h.

Details about the composition of the binder systems of the preparations and firing results after indirect printing on glass may be obtained from the table.

TABLE

| | Binder | | | | |
|---|---|---|---|---|---|
| | gD*[)] | APH | PA | K | Quality of decoration |
| Comparison example | 2.4 | 2 | 6.25 | 6.5 | Cracks in decoration; bright |
| Example | 1.9 | 5.0 | 6.5 | 3.0 | Very good; crack-free; bright; adheres well |

*[)]Data concerning solvent-free resin

The invention claimed is:

1. Noble metal preparation for the production of noble metal decorations on fireable decoration substrates, containing one or more noble metal compounds selected from the group consisting of Au, Ag, Pd and Pt, and a medium whose binder system comprises a resin mixture comprising:
   (a) 25 to 50 wt. % of one or more polyamide resins,
   (b) 5 to 30 wt. % of one or more sulfurized recent resins,
   (c) 10 to 18.3 wt. % of one or more rosin-modified resins,
   (d) 10 to 40 wt. % of one or more alkyl phenolic resins,
   (e) 0 to 30 wt. % of other resins, excluding non-plasticizing resols, wherein two or more components of said resin mixture may be present in the form of a reaction product formed at 50 to 150° C. and/or wherein one or more components of said resin system or reaction products of at least two resin components may be present in the form of a reaction product formed at 50 to 150° C. in the presence of a sulfur-containing gelation agent and the noble metal compounds, and
   (f) one or more fluxes.

2. Noble metal preparation according to claim 1, characterized in that the rosin-modified resin and the alkyl phenolic resin are present in a ratio by weight of 1:1 to 1:2.

3. Noble metal preparation according to claim 1, wherein the mixture containing the noble metal compounds and the resins or the reaction mixture thereof have been gelled by means of 0.1 to 3 wt. %, based on the preparation, of a sulfur-containing gelation agent.

4. Noble metal preparation according to claim 1, further comprising 20 to 60 wt. % of solvent with a boiling point above 110° C. selected from the group consisting of aromatic, cycloaliphatic and hydroaromatic hydrocarbons.

5. Noble metal preparation according to claim 1, characterised in that it contains 10 to 30 wt. % of the binder system.

6. Noble metal preparation according to claim 1, wherein the sulfurized recent resin comprises sulfurized dammar resin and the rosin-modified resin is selected from the group consisting of glycerine, pentaerythritol esters of rosin, and glycerine esters of maleic acid-modified rosin.

7. Noble metal preparation according to claim 1, characterized in that the binder system consists substantially of 15 to 18.3 wt. % of one or more rosin-modified resins, 8 to 20 wt. % of sulfurized dammar resin, 30 to 45 wt. % of polyamide resin and 25 to 35 wt. % of alkyl phenolic resin, wherein resin components may have formed reaction products among one another and/or in the presence of the noble metal compounds and a sulfur-containing gelation agent at 50 to 150° C.

8. Noble metal preparation according to claim 1, wherein the medium containing one or more soluble organic noble metal compounds is gelated at a temperature of 50 to 150° C. for 5 to 90 minutes before or after addition of the one or more fluxes in the presence of 0.1 to 3 wt. %, based on the preparation, of one or more gelation agents selected from the group consisting of sulfenamides, dithioamides, disulfides, trisulfides and tetrasulfides.

9. Noble metal preparation according to claim 1, wherein the noble metal compounds comprise substantially soluble gold compounds selected from the group consisting of resinates, sulforesinates, thiolates and dithiolates.

10. A process for the production of a noble metal preparation, comprising mixing of noble metal compounds with a solvent-containing or solvent-free medium comprising a binder system, wherein the binder system includes a resin mixture comprising:
   (a) 25 to 50 wt. % of one or more polyamide resins,
   (b) 5 to 30 wt. % of one or more sulfurized terpene resins, (c) 10 to 18.3 wt. % of one or more rosin-modified resins, (d) 10 to 40 wt. % of one or more alkyl phenolic resins and (e) 0 to 30 wt. % of other resins, excluding non-plasticizing resols, wherein two or more components of said resin mixture may be present in the form of a reaction product formed at 50 to 150° C. and/or wherein one or more components of said resin system or reaction products thereof may be present in the form of a reaction product formed at 50 to 150° C. in the presence of a sulfur-containing gelation agent and the noble metal compounds.

11. Decalcomania of the production of a noble metal decoration on fireable decoration substrates, comprising a backing, a decoration-forming layer and a film-forming coating layer, wherein the decoration-forming layer was produced using a noble metal preparation according to claim 1.

12. A method of production of noble metal decorations on fireable decoration substrates by direct printing using the noble metal preparation of claim 1.

13. A method of production of noble metal decorations on fireable decoration substrates by indirect printing using the decalcomania of claim 11.

14. Noble metal preparation of claim 1 wherein the one or more sulfurized recent resins comprise sulfurized dammar resins.

15. Noble metal preparation according to claim 1, further comprising 20 to 60 wt % of solvent with a boiling point above 110° C. selected from the group consisting of terpenes, ketones and alcohols.

16. A process for the production of a noble metal preparation according to claim 10, wherein the one or more sulfurized terpenes resin comprise sulfurized dammar resins.

17. A noble metal preparation for the production of noble metal decorations on fireable decoration substrates, containing one or more noble metal compounds selected from the group consisting of Au, Ag, Pd and Pt, and a medium whose binder system comprises a resin mixture comprising:

(a) 25 to 50 wt % of one or more polyamide resins, (b) 5 to 30 wt % of one or more sulfurized recent resins, (c) 10 to 18.3 wt % of one or more rosin-modified resins, (d) 10 to 40 wt % of one or more alkyl phenolic resins, (e) 0 to 30 wt % of other resins, excluding non-plasticizing resols, wherein two or more components of said resin mixture may be present in the form of a reaction product formed at 50 to 150° C. and/or wherein one or more components of said resin system or reaction products of at least two resin components may be present in the form of a reaction product formed at 50 to 150° C. in the presence of a sulfur-containing gelation agent and the noble metal compounds, and (f) a resinate flux of a metal selected from the group consisting of Rh, Bi, Cr, V, Ni, Co, Fe, Sn, Zr, Ta, Si, B and Al, wherein the rosin-modified resin and the alkyl phenolic resin are present in a weight ratio of 1:1 to 1:2, and wherein the mixture containing the noble metal compounds and the resins or the reaction mixture thereof have been gelled by means of 0.1 to 3 wt %, based on the preparation, of a sulfur-containing gelation agent.

18. The noble metal preparation of claim 17 wherein the sulfurized recent resin comprises sulfurized dammar resin and the rosin-modified resin is selected from the group consisting of glycerine or pentaerythritol esters of rosin, and glycerine esters of maleic acid-modified rosin.

19. A decorated curved glass substrate comprising a noble metal preparation containing one or more noble metal compounds selected from the group consisting of Au, Ag, Pd and Pt, and a medium whose binder system comprises a resin mixture comprising:

(a) 25 to 50 wt % of one or more polyamide resins, (b) 5 to 30 wt % of one or more sulfurized recent resins, (c) 10 to 18.3 wt % of one or more rosin-modified resins, (d) 10 to 40 wt % of one or more alkyl phenolic resins, (e) 0 to 30 wt % of other resins, excluding non-plasticizing resols, wherein two or more resin components may be present in the form of a reaction product formed at 50 to 150° C. and/or wherein one or more components of said resin system or reaction products of at least two resin components may be present in the form of a reaction product formed at 50 to 150° C. in the presence of a sulfur-containing gelation agent and the noble metal compounds, and (f) a resinate flux of a metal selected from the group consisting of Rh, Bi, Cr, V, Ni, Co, Fe, Sn, Zr, Ta, Si, B and Al.

20. The curved glass substrate of claim 19, wherein the rosin-modified resin and the alkyl phenolic resin are present in a ratio by weight of 1:1 to 1:2, and wherein the mixture containing the noble metal compounds and the resins or the reaction mixture thereof have been gelled by 0.1 to 3 wt %, based on the preparation, of a sulfur-containing gelation agent.

* * * * *